United States Patent
Miyamoto et al.

(10) Patent No.: US 11,715,229 B2
(45) Date of Patent: Aug. 1, 2023

(54) MOVING BODY AND SYSTEM

(71) Applicant: KABUSHIKI KAISHA TOSHIBA, Minato-ku (JP)

(72) Inventors: Takuya Miyamoto, Kawasaki (JP); Kenichi Shimoyama, Tokyo (JP); Keiko Noguchi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 173 days.

(21) Appl. No.: 17/006,967

(22) Filed: Aug. 31, 2020

(65) Prior Publication Data
US 2021/0150750 A1 May 20, 2021

(30) Foreign Application Priority Data
Nov. 15, 2019 (JP) .................. 2019-207099

(51) Int. Cl.
*G06T 7/70* (2017.01)
*G06T 7/00* (2017.01)
*G06T 7/20* (2017.01)

(52) U.S. Cl.
CPC .............. *G06T 7/70* (2017.01); *G06T 7/0002* (2013.01); *G06T 7/20* (2013.01); *G06T 2207/10012* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,178,315 B1* | 1/2019 | Buchmueller | B64D 47/08 |
| 2012/0176492 A1* | 7/2012 | Garin | G01C 21/1656 |
| | | | 348/113 |

(Continued)

FOREIGN PATENT DOCUMENTS

| | | |
|---|---|---|
| CN | 110018688 A | 7/2019 |
| JP | 2016-162013 A | 9/2016 |

(Continued)

OTHER PUBLICATIONS

Mishima, N. et al., "Physical Cue based Depth-Sensing by Color Coding with Deaberration Network," 2019 British Machine Vision Conference (BMVC), arXiv:1908.00329v1 [cs.CV], Aug. 1, 2019, 13 pages.

(Continued)

*Primary Examiner* — Leon Viet Q Nguyen
(74) *Attorney, Agent, or Firm* — Oblon, McClelland, Maier & Neustadt, L.L.P.

(57) ABSTRACT

A moving body includes processing circuitry. The processing circuitry is configured to collect an external image of the moving body from an external sensor and collect information associated with an inner state of the moving body from an internal sensor. The processing circuitry is configured to determine whether or not to adopt the external image collected by the external sensor as a first image for estimating a position of the moving body, based on the information associated with the inner state of the moving body collected by the internal sensor. The processing circuitry is configured to estimate a position of the moving body by comparing the first image and a second image associated with a collection position of the first image.

6 Claims, 10 Drawing Sheets

(56) References Cited

U.S. PATENT DOCUMENTS

2018/0046187 A1* 2/2018 Martirosyan .......... B64D 47/08
2019/0068962 A1* 2/2019 Van Schoyck ....... G08G 5/0021
2020/0402256 A1* 12/2020 Kobayashi .............. G01S 17/42

FOREIGN PATENT DOCUMENTS

| JP | 2017-93626 A | 6/2017 |
| JP | 2018-165889 A | 10/2018 |
| JP | 2019-67001 A | 4/2019 |

OTHER PUBLICATIONS

Borenstein, J. et al., "Measurement and Correction of Systematic Odometry Errors in Mobile Robots," IEEE Transactions on Robotics and Automation, vol. 12, No. 6, Dec. 1996, 25 pages.

* cited by examiner

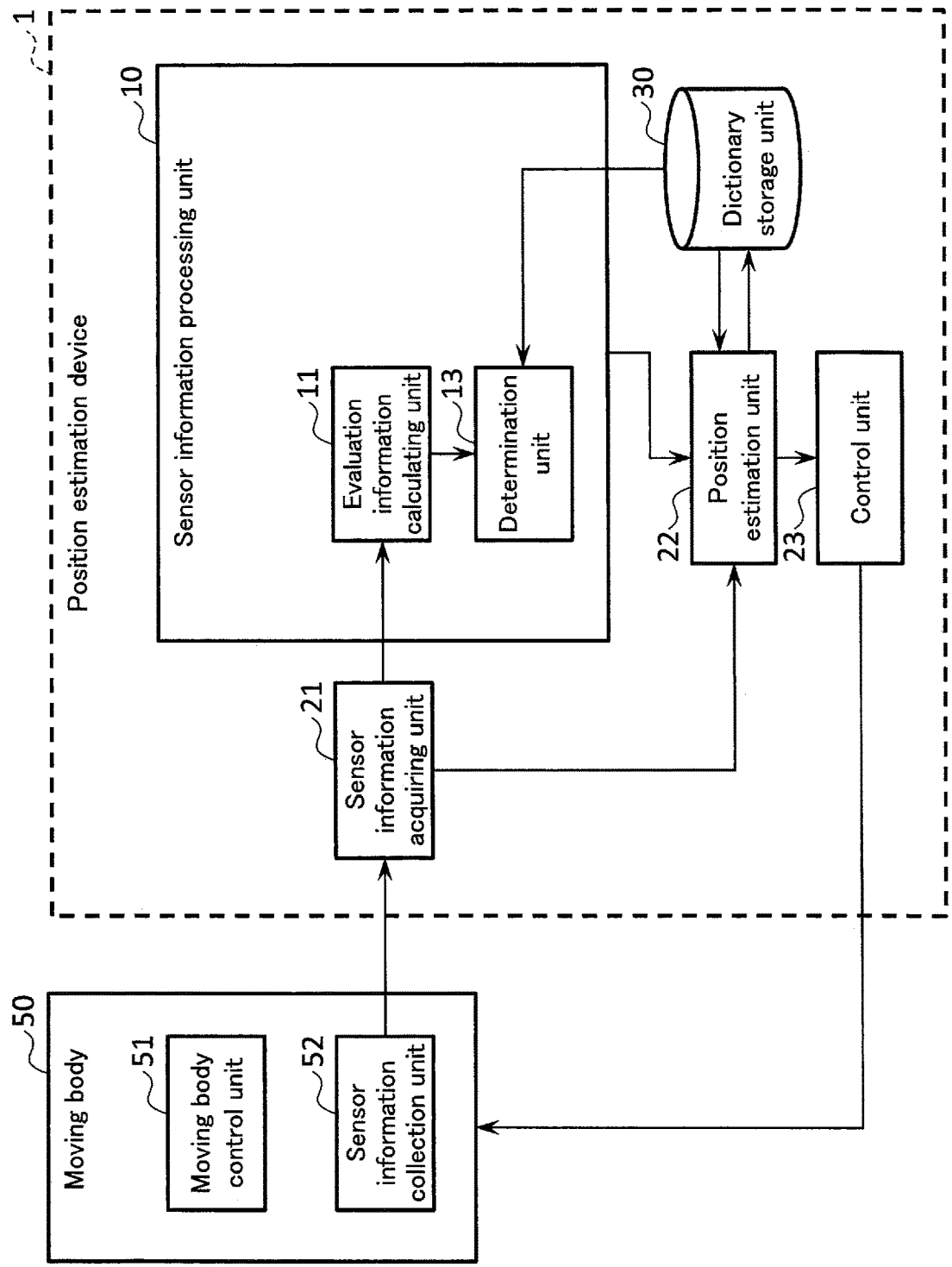
F I G. 1

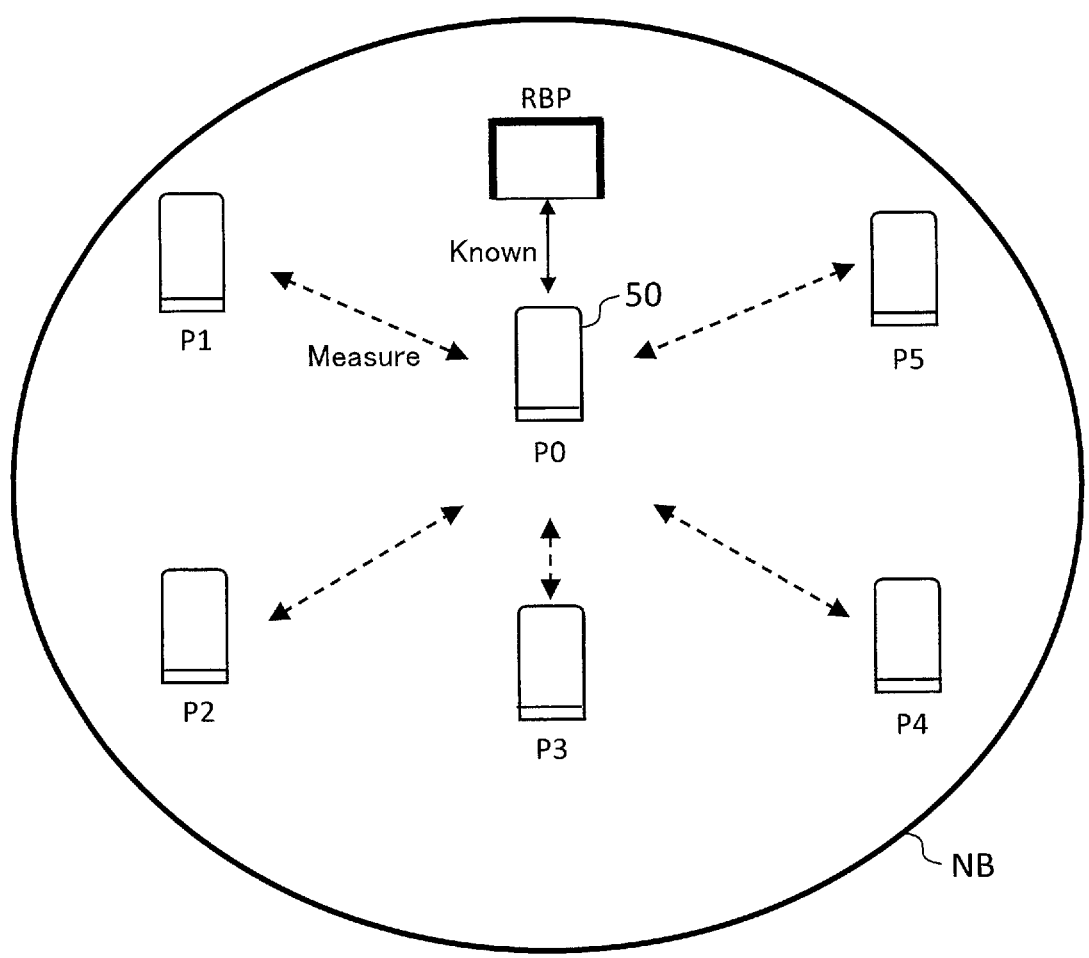
F I G. 5

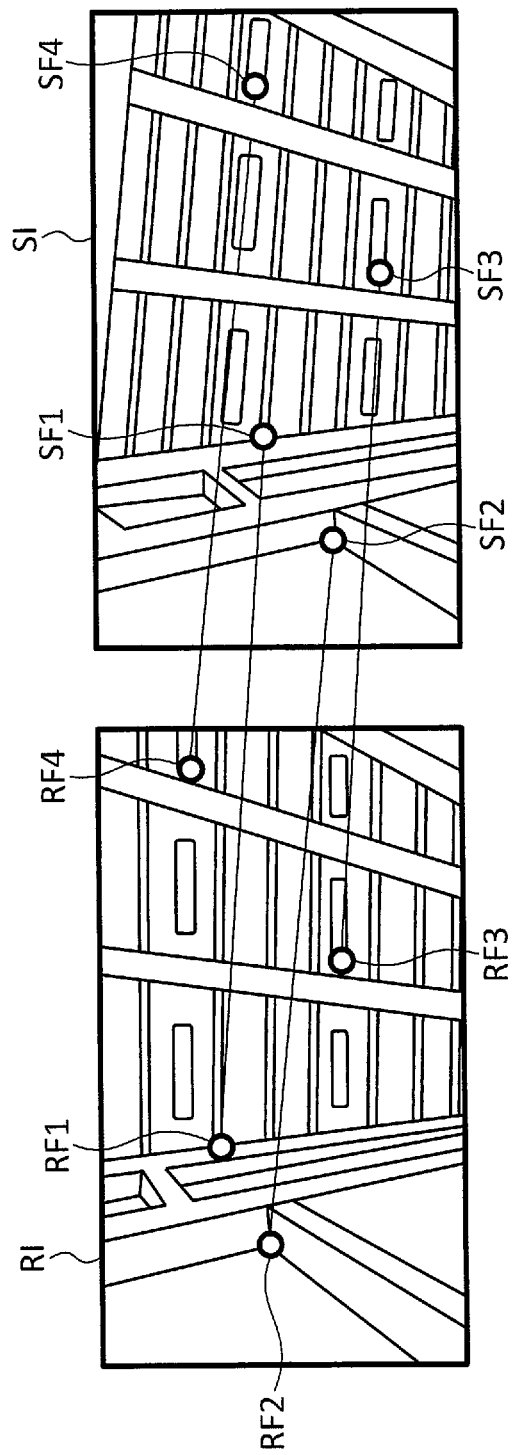

MOVING BODY AND SYSTEM

CROSS-REFERENCE TO RELATED APPLICATIONS

This application is based upon and claims the benefit of priority from the Japanese Patent Application No. 2019-207099, filed Nov. 15, 2019, the entire contents of which are incorporated herein by reference.

FIELD

Embodiments described herein relate to a moving body and a system including the same.

BACKGROUND

Development of a moving body for automatic conveyance of a cage truck at a distribution warehouse is in progress. A moving body receives a cage truck loaded with packages at a designated position, autonomously carries a received cage truck to a designated position and displays the cage truck at a designated position. Among these operations, in order to accurately perform the operations for receiving the cage truck and displaying the cage truck, an accurate position estimate of the moving body becomes necessary.

As a method for estimating the position of the moving body, there exists the use of an obtained image by a camera attached to a moving body. For example, in one method, a position information database which stores an image captured at a target position and an image captured at a plurality of positions in a traveling area are prepared in advance, and the position of the moving body is estimated by referring to an image stored in the position information database and an image obtained by the camera of the moving body.

When estimating the position by referring to an image, if a capture conditions at the time of capture, such as a shaking camera etc. are not considered, the image quality of the image to be referred will be unstable and the degree of estimation accuracy for the position will decrease.

The embodiment provides a moving body and a system including the same where the estimation accuracy of the position is improved.

BRIEF DESCRIPTION OF THE DRAWINGS

FIG. 1 is a diagram showing a configuration of one example of a system according to a first embodiment.

FIG. 5 is a diagram showing an example of capture positions of an image to be registered to the reference dictionary in accordance with the process of FIG. 4.

FIG. 7B is a diagram showing an example when feature point matching is performed at images with similar capture conditions.

DETAILED DESCRIPTION

Figure 2:
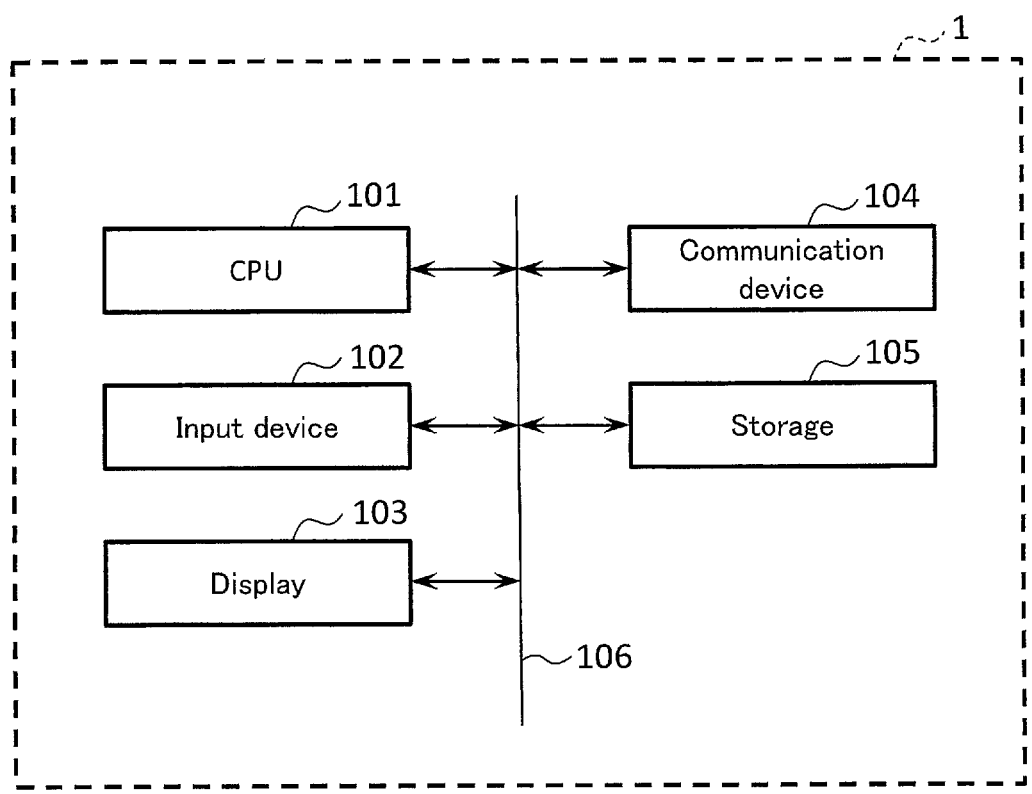
FIG. 2 is a diagram showing one example of a hardware configuration of a position estimation device.

According to one embodiment, a moving body includes processing circuitry. The processing circuitry is configured to collect an external image of the moving body from an external sensor and collect information associated with an inner state of the moving body from an internal sensor. The processing circuitry is configured to determine whether or not to adopt the external image collected by the external sensor as a first image for estimating a position of the moving body, based on the information associated with the inner state of the moving body collected by the internal sensor. The processing circuitry is configured to estimate a position of the moving body by comparing the first image and a second image associated with a collection position of the first image.

Hereinafter, embodiments will be described with reference to the drawings.

First Embodiment

FIG. 1 is a diagram showing a configuration of one example of a system according to a first embodiment. The system includes a position estimation device 1, and a moving body 50. The position estimation device 1 is configured to be communicable with the moving body 50.

The moving body 50 includes a moving body control unit 51, and a sensor information collection unit 52. Further, though not shown in the drawings, the moving body 50 includes a drive mechanism necessary for moving.

The moving body control unit 51 performs control associated with the movement etc. of the moving body 50. The moving body control unit 51, for example, performs control of the drive mechanism for moving the moving body 50 to a designated target position.

The sensor information collection unit 52 includes various types of an internal sensor and an external sensor installed in the moving body 50, and collects various sensor information. The internal sensor is a sensor for enabling the moving body 50 to collect sensor information associated with its own state. In the embodiment, the internal sensor mainly collects sensor information associated with movement of the moving body 50. On the other hand, the external sensor is a sensor which collects sensor information associated with a state outside the moving body 50. In the embodiment, the external sensor mainly collects an image outside the moving body 50.

The position estimation device 1 is configured to estimate a position of the moving body 50 from an image collected by the moving body 50. The position estimation device 1 may take the form of a superior system for controlling movement of the moving body 50 based on an estimation result of the position of the moving body 50. The position estimation device 1 may be for example, a personal computer (PC). The position estimation device 1 includes a sensor information processing unit 10, a sensor information acquiring unit 21, a position estimation unit 22, a control unit 23, and a dictionary storage unit 30.

The sensor information acquiring unit 21 acquires sensor information from the sensor information collection unit 52 of the moving body 50. For example, the sensor information acquiring unit 21 extracts sensor information from a signal communicated from the moving body 50.

The sensor information processing unit 10 processes sensor information acquired at the sensor information acquiring unit 21. The sensor information processing unit 10 includes an evaluation information calculating unit 11, and a determination unit 12.

The evaluation information calculating unit 11 calculates evaluation information for determining by the determination unit 12, based on sensor information of the internal sensor of the moving body 50 acquired by the sensor information acquiring unit 21. The evaluation information is, e.g., information associated with a movement of the moving body 50, and includes for example, velocity, angular velocity, and acceleration of the moving body 50.

The determination unit 12 determines whether or not an image outside the moving body 50 acquired by the sensor information acquiring unit 21 can be adopted for the estimation of the position of the moving body 50. The determination unit 12 determines to adopt, for the estimation of the position of the moving body 50, an image of evaluation information with similar evaluation information at the time of collecting images stored in the dictionary storage unit 30.

The position estimation unit 22 estimates a position of the moving body 50 based on the image determined to be adopted for the estimation of the position by the determination unit 12 out of the images outside the moving body 50 acquired by the sensor information acquiring unit 21, and the images registered to the dictionary storage unit 30.

The control unit 23 controls the operation of the moving body 50 in accordance with the position of the moving body 50 estimated at the position estimation unit 22.

The dictionary storage unit 30 stores a dictionary for storing an image of a target position of the moving body 50, images collected at a plurality of capture positions near the target position, feature points and feature amounts extracted from each image, the degree of correspondence between each image, information on the collection position for each image, and evaluation information for each image.

FIG. 2 is a diagram showing one example of a hardware configuration of a position estimation device. The position estimation device 1, for example, includes a CPU 101, an input device 102, a display 103, a communication device 104, a storage 105 as hardware. The CPU 101, the input device 102, the display 103, the communication device 104, and the storage 105 are connected to a bus 106.

The CPU 101 is a processor for controlling the entire operation of the position estimation device 1. The CPU 101, by executing a program stored in, e.g., the storage 105, operates as the sensor information processing unit 10, the sensor information acquiring unit 21, the position estimation unit 22, and the control unit 23. The CPU 101 may be replaced with MPU, GPU, ASIC, FPGA etc. The CPU 101 may be a single CPU etc. or a plurality of CPU etc.

The input device 102 is an input device such as a joystick, a touch panel, a keyboard, and a mouse etc. When the input device 102 is operated, a signal corresponding to the operation matter is input to the CPU 101 via the bus 106. The CPU 101 performs various processes in accordance with this signal.

The display 103 is a display such as liquid crystal display or organic EL display. The display device 103 displays various images.

The communication device 104 is a communication device for performing, for example, a wireless LAN communication. The communication device 104 communicates with the moving body 50. The communication device 104 need not necessarily be a communication device for wireless LAN communication.

The storage 105 is a storage device such as a hard disk drive or a solid state drive. The storage 105 operates as the dictionary storage unit 30. Further, the storage 105 stores various programs executed by the CPU 101.

The bus 106 is a data transfer path for data exchange between the CPU 101, the input device 102, the display 103, the communication device 104, and the storage 105.

The following explains in more detail the matters regarding each configuration shown in FIG. 1. The moving body 50 shown in FIG. 1 is for example, an automated guided vehicle (AGV). The AGV is a trackless vehicle which automatically travels to a designated package loading location, and carries the package loaded by the person or automated robots etc. at the package loading location to a designated unloading location. The moving body 50 includes various drive mechanisms. For example, the moving body 50 may include a two-wheeled drive mechanism, a four-wheeled drive mechanism, or a crawler (caterpillar) mechanism. Further, the moving body 50 may be a two-legged or multi-legged moving body, or may be an air vehicle apparatus. The moving body 50 may not be trackless, and may be a line-tracing moving body which moves along a designated track. Unless otherwise stated in the embodiment, the moving body 50 is an AGV.

The moving body control unit 51 performs control of the drive mechanism for moving the moving body 50 to a designated target position. The moving body control unit 51 recognizes its position by the position estimated at the position estimation device 1, and may control the drive mechanism by determining the necessary direction and distance for moving towards the designated target position. The target position of the moving body 50 may be acquired from any one of: the host system of the moving body 50, e.g. the position estimation device 1, invoking a prior setting, or a setting directly performed by a person. The target position is not only a spatial position of the moving body 50, and may include a posture of the moving body 50 at the target position. Unless otherwise stated in the embodiment, the position and the posture of the sensor mounted to the moving body 50 are the position and the posture of the moving body. When the target position is designated, specific position coordinates may be specified and, through use of the map information etc. of the operation, areas such as "position A" or "operation area B" may also be designated. Further, the instruction of movement is not limited to the instruction for designating the absolute position, and may be an instruction for designating a relative position from the current position. For example, the instruction of movement may be an instruction such as circling 30 degrees clockwise at a position 1 m ahead. When moving a predetermined location, a movement path may also become important. Even if the moving body tries to simply move linearly to a predetermined position, there are cases where the movement becomes difficult due to obstacles etc. The movement path may be decided by the moving body control unit 51 or provided by a superior system. Thus, the movement path may be provided by invoking a preset matter or by a direct setting made by a person.

The internal sensor of the sensor information collection unit 52 for example, includes, a rotary encoder, an acceleration sensor, and an angular velocity sensor such as a gyro sensor. The movement amount and the posture of the moving body 50 may be measured by the internal sensor. From the movement amount and the posture of the moving body 50, an estimated position of the moving body 50 can be acquired.

The external sensor of the sensor information collection unit 52 collects the images outside of the moving body 50. It is preferable if the external sensor collects, in addition to the images outside the moving body 50, sensor information for measuring or calculating a peripheral distance of the moving body 50. It is further preferable if the external sensor collects sensor information for measuring or calculating the peripheral distance of the moving body 50 at the surface. For example, Depth Camera and LIDAR (Light Detecting and Raging) etc. can collect planar distance images. The distance image is an image generated by converting the value of distance to a value of brightness. The Depth Camera may be any method such as ToF (Time of Flight) method, pattern irradiation method etc. Further, even a line measurement laser range finder, may collect planar distance images by altering the mechanical measurement direction or a measurement direction for multiple units. In addition, it is possible to utilize a stereo camera or single lens camera etc. as a method of indirect measurement. In the case of a stereo camera, images may be converted to distance information by a stereo matching method. Even in the case of a single lens camera, changes to the moving body position and posture can realize capture akin to that of a stereo camera, rendering it possible to calculate the distance information. The external sensor may be something other than the above. Unless otherwise stated in the embodiment, the external sensor is a stereo camera.

Figure 3:
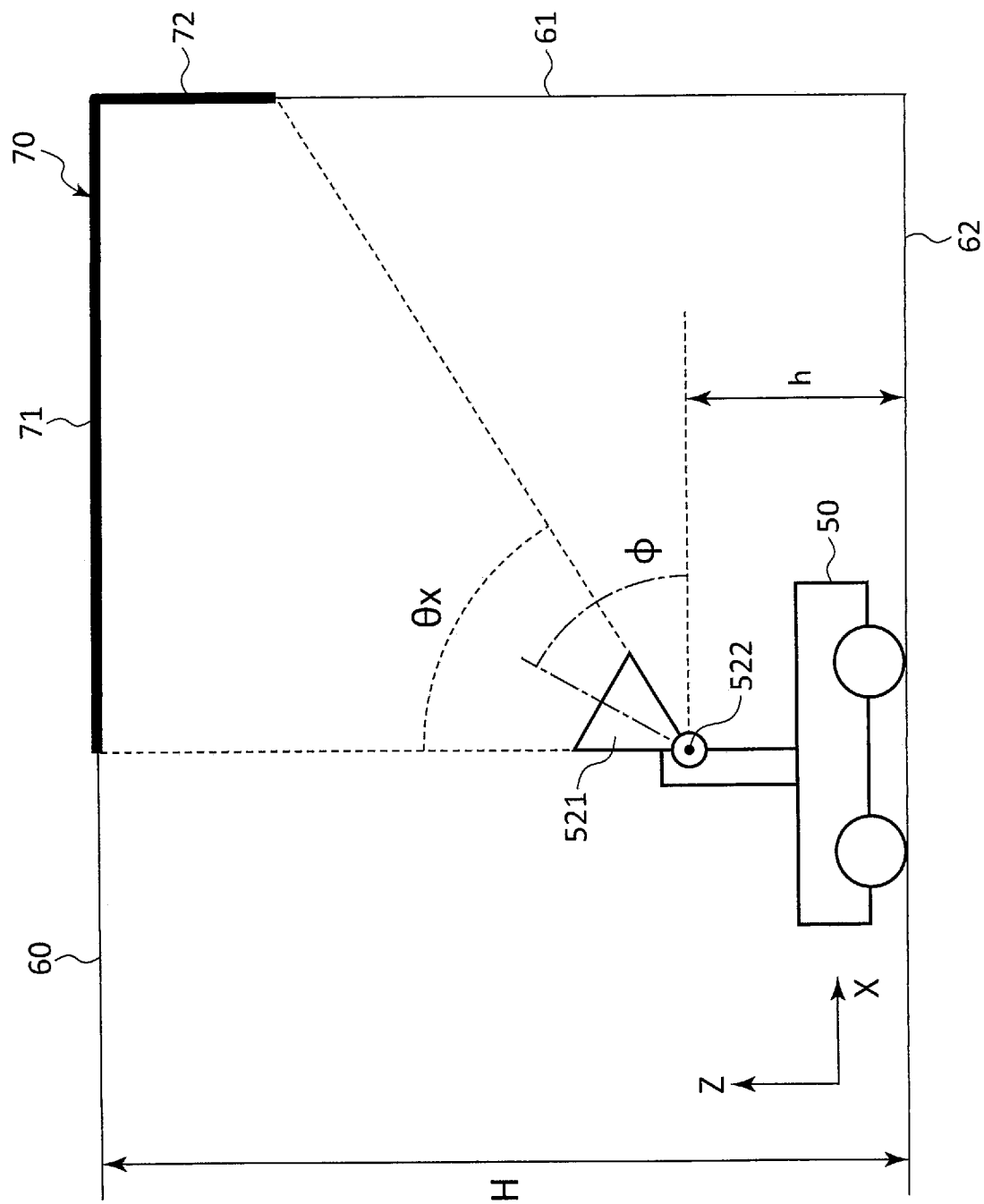
FIG. 3 is a diagram showing an arrangement example of a stereo camera as one example of an external sensor.

FIG. 3 shows an arrangement example of a stereo camera as one example of an external sensor. In FIG. 3, the stereo camera 521 is arranged on the upper central portion of the moving body 50. The stereo camera 521 is arranged so that its optic central 522 is at a position of height h from a ground 62. In addition, an optical axis of the stereo camera 521 is slanted for angle φ to the ground 62. Further, the angle of view of the stereo camera 521 is θx. A capture range 70 of the stereo camera 521 is a capture range 71 including a ceiling 60, which is mainly the position of height H from the ground 62. As shown in FIG. 3, when the moving body 50 comes close to a wall 61, the capture range 70 of the stereo camera 521 becomes capture ranges 71 and 72 including the ceiling 60 and the wall 61. The capture range 70 of the stereo camera 521 may be changed depending on the usage of the images collected at the stereo camera 521. For example, when the usage is estimating the position of the moving body 50, it is preferable for the subject of the image collected at the stereo camera 521 to vary depending only on the position of the moving body 50, and not temporally. As shown in FIG. 3, with the capture ranges 71 and 72 set to include the ceiling 60 and the wall 61, capture range 70 of the stereo camera 521 may collect images suitable for estimating the position of the moving body 50 for a subject with low temporal variation. The arrangement position and the orientation of the stereo camera 521 is not limited to those shown in FIG. 3.

Next, the sensor information processing unit 10 will be further explained. The evaluation information calculating unit 11 calculates evaluation information associated with movement of the moving body 50 from internal sensor information acquired at the sensor information acquiring unit 21.

The information associated with the movement of the moving body 50 is, for example, the velocity of the moving body 50. In this case, the evaluation information calculating unit 11 calculates the amount of movement of the moving body 50 from a measurement value of the rotary encoder as an internal sensor, attached to for example, wheels of the moving body 50. In addition, the evaluation information calculating unit 11 calculates the velocity of the moving body 50 by differentiating the calculated moving amount by time. The evaluation information calculating unit 11 may calculate the velocity of the moving body 50 by converting the rotation speed of the drive mechanism, such as wheels etc., to a velocity of the moving body 50, or by calculating the velocity of the moving body 50 by converting the angular velocity of the drive mechanism, such as wheels etc., to the velocity of the moving body 50. Further, if an acceleration sensor is attached as an internal sensor to the moving body 50, the evaluation information calculating unit 11 may calculate the velocity of the moving body 50 by integrating the acceleration of the main body of the moving body 50. Further, the evaluation information calculating unit 11 may calculate the velocity of the moving body 50 from a drive current value etc. input from the moving body control unit 51 to the drive mechanism of the wheels etc. In other words, the evaluation information calculating unit 11 may calculate the velocity using sensor information of any type of internal sensor.

The information associated with the movement of the moving body 50 is not limited to the velocity of the moving body 50. For example, the information associated with the movement of the moving body 50 may be a rotational speed or angular velocity of the drive mechanism of wheels etc. provided to the moving body 50, or acceleration of the moving body 50.

The determination unit 12, by referring to the evaluation information associated with movement of the moving body 50 calculated at the evaluation information calculating unit 11, and evaluation information associated with an image of the target position registered in the dictionary storage unit 30, determines whether or not to adopt an image collected by the moving body 50 as an image for estimating a position of the moving body 50. More specifically, the determination unit 12, when the difference in the evaluation information is small, determines that the image collected at the moving body 50 is a suitable image for estimating a position of the moving body 50. At this point, the determination unit 12 determines to adopt the image collected at the moving body 50 as the image for estimating the position of the moving body 50.

For example, the determination unit 12 determines if the image collected at the moving body 50 is the suitable image for estimating the position of the moving body 50, when a difference between the velocity of the moving body 50 calculated at the evaluation information calculating unit 11 and the velocity associated with the image of the target position registered in the dictionary storage unit 30 is within a certain range. This range of velocity difference may be designated by a person, or defined from the ratio to the velocity associated with the image of the target position registered to the dictionary storage unit 30. For example, the range of velocity difference may be set to 0±0.1 [m/s] for a state when the moving body 50 is stopped. In addition, for example, if the image of the target position registered in the dictionary storage unit 30 is captured when the velocity is 3 [m/s], the range of the velocity difference is set to ±0.3 [m/s] which is its 10%.

The determination unit 12 may convert the velocity registered in the dictionary storage unit 30 to sensor information of the internal sensor such as the rotary encoder or the gyro sensor etc. and compares such converted sensor information with sensor information of the internal sensor. In this case, the determination unit 12 may determine that the image collected by the moving body 50 is the suitable image for estimating the position of the moving body 50, when the difference between the sensor information acquired at the sensor information acquiring unit 21 and sensor information converted from the velocity registered in the dictionary storage unit 30 is within a predetermined range. For example, when the angular velocity converted from the velocity registered to the dictionary storage unit 30 is 10 [rad/s], the determination unit 12 determines that the image should be used if the difference of the angular velocity acquired by the sensor information acquiring unit 21 being ±1 [rad/s].

In addition, when a plurality of images of the target position are registered with the dictionary storage unit 30, the determination unit 12 may determine the target position as either that designated by the superior system, or one set in advance.

Next, the dictionary storage unit 30 is explained. The dictionary storage unit 30 stores a reference dictionary in which information necessary to the target position at the sensor information processing unit 10 and the position estimation unit 22 is registered. The registered information of the reference dictionary, for example, is the following.

Images of target position and its surroundings
Feature points and feature amounts of images of target position and its surroundings
Effect of correspondence between the images
Positions of target position and its surroundings
Evaluation information (for example, velocity) associated with movement of moving body during capture of the image of the target position.

There are two ways of registering with the reference dictionary when a plurality of target positions exists, 1) a method of collecting the registration information for all target positions and registering to one dictionary, or 2) a method separating the dictionary for each target position. The method 1) will not require the selection of a dictionary; however, as it becomes necessary to match the feature points for all images registered in the reference dictionary, the process of estimating the position will become time-consuming. Further, as it can be completed merely by the process of registering the necessary target position with the reference dictionary, the process time for estimating the position in method 2) is shorter. On the other hand, in the method 2), it is necessary to designate the reference dictionary to be used by a host system or person etc. As can be seen from the above reference dictionary registration methods 1) and 2), both have their advantages and disadvantages. Thus, it is preferable if the registration methods 1) and 2) for the reference dictionary are used in different situations when necessary.

Figure 4:
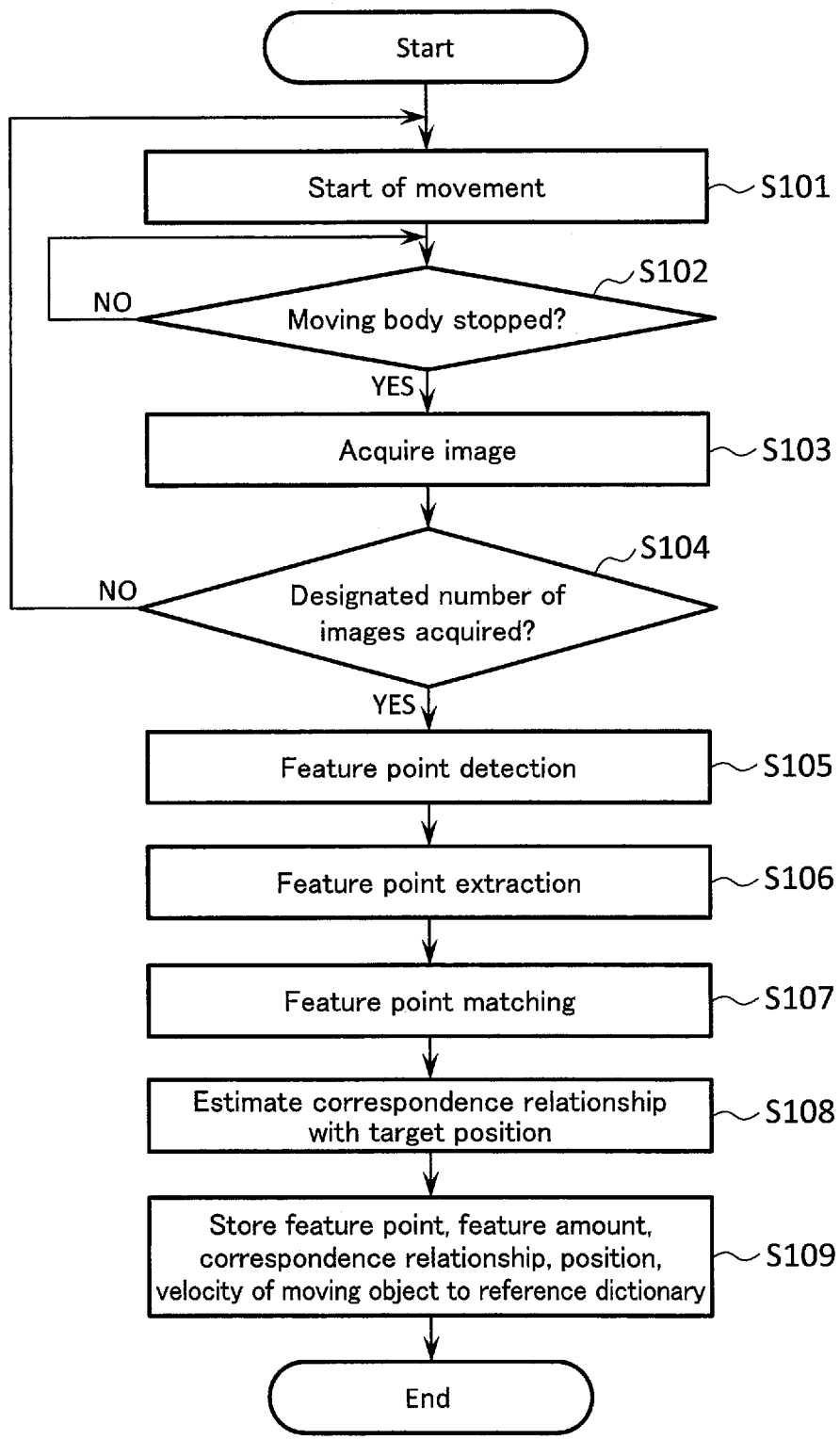
FIG. 4 is a flowchart indicating a process when preparing a reference dictionary.

FIG. 4 is a flowchart indicating a process when preparing a reference dictionary. The process of FIG. 4 will be performed before the estimation of the position.

In step S101, the control unit 23 of the position estimation device 1 starts moving the moving body 50 to one designated position. The designated position includes the target position and its surrounding capture positions. The control unit 23 selects one of the above and instructs the moving body 50 to move. With this instruction, the moving body 50 starts autonomous movement. The movement of the moving body 50 may be performed manually by the operation of a joystick etc.

In step S102, the control unit 23 determines, from sensor information acquired at the sensor information acquiring unit 21, whether or not the moving body 50 has stopped. The control unit 23, for example, calculates the velocity of the moving body 50 from the sensor information acquired at the sensor information acquiring unit 21, and determines whether the moving body 50 has stopped when the calculated velocity is equal to or lower than a threshold. For the velocity of the moving body 50, the velocity calculated at the evaluation information calculating unit 11 may be used. Here, the stoppage of the moving body 50 is not limited to the arrival of the target position or the capture positions. For example, the moving body 50 may be configured stop at a corner etc. when moving towards the target position or the capture positions. In the determination of step S102, even for the above case, if the velocity of the moving body 50 is equal to or lower than the threshold, it is determined that the moving body 50 has stopped. In step S102, the process is on standby until it is determined that the moving body 50 has stopped. In step S102, when it is determined that the moving body 50 has stopped, the process proceeds to step S103.

In step S103, the control unit 23 instructs the moving body 50 to capture and acquires an image from the moving body 50.

In step S104, the control unit 23 determines whether or not to a designated number of images have been acquired. In an exemplary instance, the control unit 23 determines that the designated number of images have been acquired when the images of the target position and all capture positions have been acquired. In step S104, if the designated number of images are not acquired, i.e., if there is still the capture position in which the image has not been acquired, the process will return to step S101. In this case, the control unit 23 will designate a new capture position and start the movement of the moving body 50. In step S104, if a designated number of images are acquired, the process proceeds to step S105.

In step S105, the position estimation unit 22 detects the feature points of the acquired images. The position estimation unit 22 may detect the feature points using SIFT (Scale Invariant Feature Transform), AKAZE (Accelerated KAZE) etc.

In step S106, the position estimation unit 22 extracts feature amounts from the respective detected feature points. In the position estimation unit 22, the feature amounts may be extracted in accordance with the method used in the feature point detection.

In step S107, the position estimation unit 22 performs feature point matching for the target position image and the image at each capture position. More specifically, the position estimation unit 22 associates the feature points between the target position image and the image at each capture position so that the difference in the feature amounts will be the smallest. The position estimation unit 22 may perform feature point matching at the method of NN (Nearest Neighbor), k-NN, kd-Tree, humming distance etc.

In step S108, the position estimation unit 22 performs estimation of correspondence between a target position image and an image of each capture position. For example, the position estimation unit 22 performs estimation of relative position and relative posture of the moving body 50 at each capture position to the target position from a correspondence of feature points between a target position image and each capture position image. In addition, the position estimation unit 22 generates three-dimensional information for each image by a triangulation principle using the designated relative position and relative posture.

In step S109, the position estimation unit 22 registers to the reference dictionary: feature points and feature amounts for every image, correspondence between the images of each capture position and the target position, coordinates of the target position and the capture positions, and evaluation information associated with the movement of the moving body 50 when collecting respective images, e.g., velocity of the moving body 50.

FIG. 5 is a diagram showing an example of a capture positions of an image to be registered to the reference dictionary in accordance with the process of FIG. 4. In FIG. 5, a position directly in front of a cage truck position RBP is set to be a target position P0. In addition, positions P1, P2, P3, P4 and P5 surrounding the target position P0 are set to capture positions. At the capture positions P1, P2, P3, P4 and P5, capture is taken with the stereo camera directed to the target position P0. The target position P0 is a known position provided by, for example, a superior system etc. On the other hand, the capture positions P1 to P5 are positions for performing measurements each time capture is taken at the respective positions.

Here, the number of images registered to the reference dictionary, i.e., the number of capture positions, is not limited to a specific value. Furthermore, in principle, no problem is posed by any type of positional relationship between the target position and each capture position. In a practical sense, it is desirable that the capture positions are positioned within a vicinity range NB of the target position.

Figure 6:
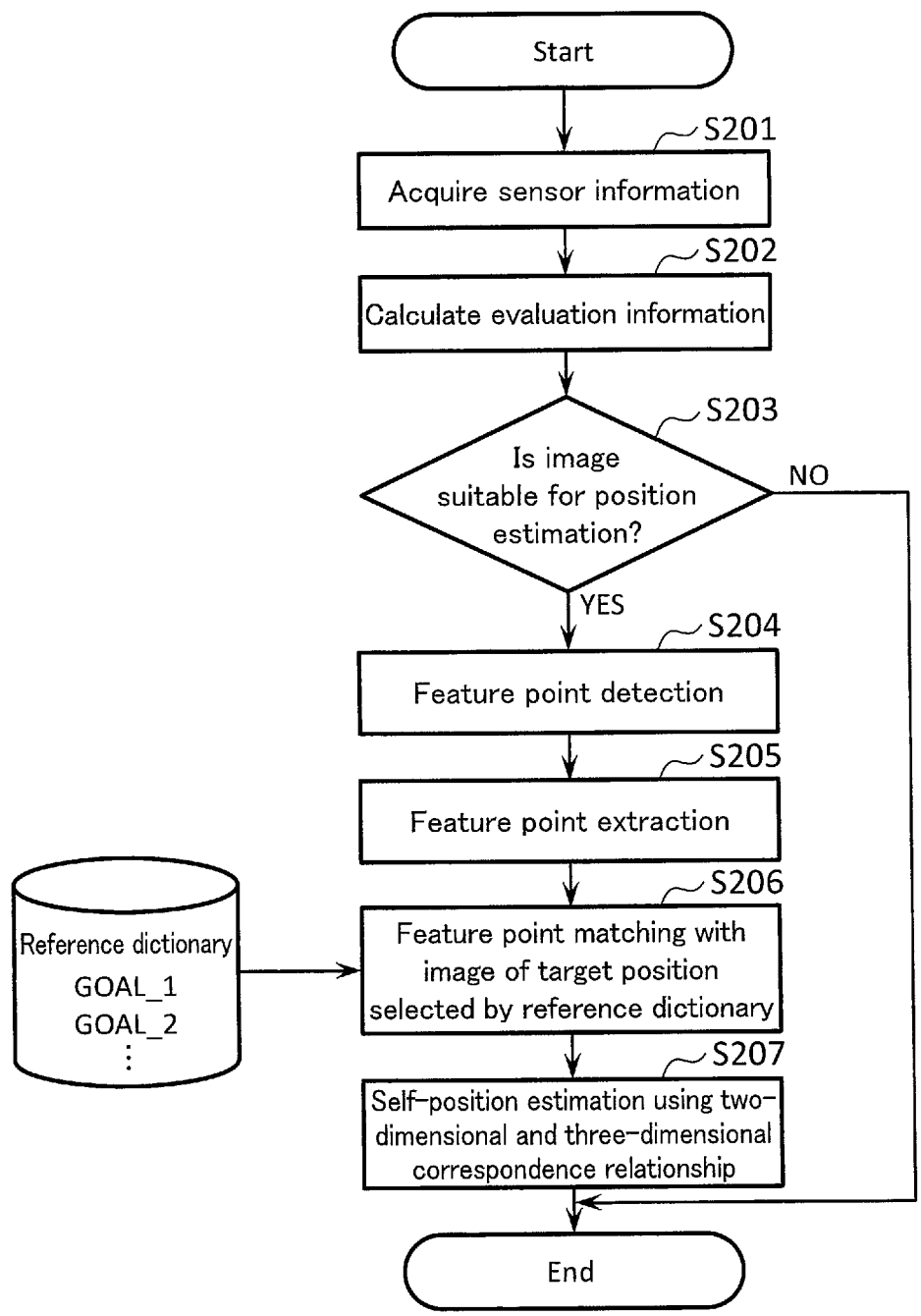
FIG. 6 is a flowchart indicating a process during position estimation.

Next, the position estimation unit 22 is explained. The position estimation unit 22 estimates a position of the moving body 50 by comparing the image among those acquired at the sensor information acquiring unit 21 that is determined, by the determination unit 12 of the sensor information processing unit 10, as being adoptable for estimation of a position of the moving body 50, with an image registered to the reference dictionary of the dictionary storage unit 30. FIG. 6 is a flowchart indicating a process during position estimation.

In step S201, the sensor information acquiring unit 21 acquires sensor information, e.g., a measurement value of a rotary encoder, of an internal sensor from the sensor information collection unit 52 of the moving body 50, and sensor information, e.g., an image obtained by a stereo camera, of an external sensor. The sensor information acquiring unit 21 acquires sensor information, from the sensor information collection unit 52, of the moving body 50 at, for example, every constant interval.

In step S202, the evaluation information calculating unit 11 calculates evaluation information from sensor information of the internal sensor acquired at the sensor information acquiring unit 21. For example, the evaluation information calculating unit 11 calculates the velocity of the moving body 50 from the measurement value of the rotary encoder.

In step S203, the determination unit 12 determines whether or not the image acquired from the sensor information acquiring unit 21 is suitable for estimating the position of the moving body 50. For example, the determination unit 12 determines if the image collected at the moving body 50 is the suitable image for estimating the position of the moving body 50, when a difference between the velocity of the moving body 50 calculated at the evaluation information calculating unit 11 and the velocity associated with the image of the target position registered in the dictionary storage unit 30 is within a certain range. In step S203, the process of FIG. 6 is terminated when the image acquired from the sensor information acquiring unit 21 is determined as unsuitable for the estimation of the position of the moving body 50. The process of FIG. 6 is performed once again at a timing of acquiring the next sensor information by the sensor information acquiring unit 21. In step S203, when the image acquired from the sensor information acquiring unit 21 is determined as suitable for estimating the position of the moving body 50, the process proceeds to step S204.

In step S204, the position estimation unit 22 acquires, from the sensor information acquiring unit 21, the image determined for adoption as the position estimate deemed suitable for such a purpose in step S203. Further, the position estimation unit 22 detects the feature points from the acquired image. The position estimation unit 22 may detect the feature points using SIFT (Scale Invariant Feature Transform), AKAZE (Accelerated KAZE) etc.

In step S205, the position estimation unit 22 extracts feature amounts from the respective detected feature points. In the position estimation unit 22, the feature amounts may be extracted in accordance with the method used in the feature point detection.

In step S206, the position estimation unit 22 performs feature point matching for the target position image and images of surrounding capture positions registered to the reference dictionary stored in the dictionary storage unit 30, as well as for the image acquired at the sensor information acquiring unit 21. More specifically, the position estimation unit 22 performs the feature point matching so that the difference in feature amount will be at the minimum. When a plurality of target positions are registered to the reference dictionary, it is necessary to select the target position. The target position may be selected by either 1) a method of acquiring a target position from a host system mounted on the moving body, or 2) a method of estimating positions of the moving body 50 to all target positions registered to the reference dictionary and selecting the best estimation result.

In step S207, the position estimation unit 22 calculates the relative position using PnP (Perspective n-Point) from the relationship between three-dimensional point groups and its corresponding two-dimensional points of feature points registered to the reference dictionary. Further, the position estimation unit 22 estimates a position of the moving body 50 from the target position. Afterwards, the process of FIG. 6 is terminated. The process of FIG. 6 is performed once again at a timing when the next sensor information is acquired by the sensor information acquiring unit 21.

In the first embodiment as explained above, when the difference between evaluation information based on sensor information collected at the internal sensor included by the moving body 50 and evaluation information based on sensor information at the time of collecting the image registered to the reference dictionary is small, the image collected by the external sensor included to the moving body 50 is adopted as the image for estimating the position of the moving body 50.

The precision of the position of the moving body 50 estimated at the position estimation unit 22 changes greatly depending on whether or not the capture conditions are considered.

Figure 7A:
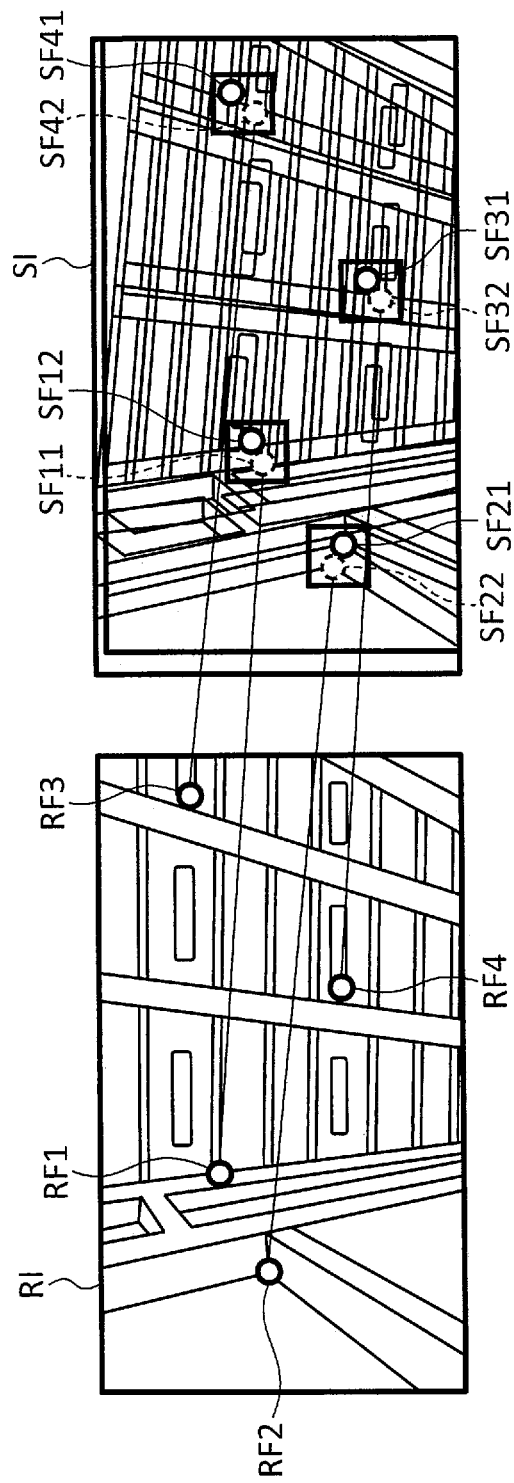
FIG. 7A is a diagram showing an example when feature point matching is performed at images with different capture conditions.

FIG. 7A is a diagram showing an example when feature point matching is performed at images with different capture conditions. The image RI of FIG. 7A is an image registered to the reference dictionary, and an image SI is an image collected for position estimation. There is a possibility that the capture conditions differ from the time of collecting for the position estimation and the time of registration to the reference dictionary. For example, the image SI in FIG. 7A is blurred in a way that does not occur in image RI due to the shaking of the moving body 50 at the time the capture was taken. In this case, as a result of matching between image RI and image SI, there is a possibility that matching may occur at a position different from the position of the original feature points to be matched. In FIG. 7A, a feature point RF1 and a feature point SF11, a feature point RF2 and a feature point SF21, a feature point RF3 and a feature point SF31, and a feature point RF4 and a feature point SF41 should be matched; however, the figure indicates the feature point RF1 and the feature point SF12, the feature point RF2 and the feature point SF22, the feature point RF3 and the feature point SF32, and the feature point RF4 and the feature point SF42 as being matched. The false matching results of the feature points lowers the estimation accuracy of the position.

FIG. 7B is a diagram showing an example when feature point matching is performed at images with similar capture conditions. The image RI of FIG. 7B is an image registered to the reference dictionary, and an image SI is an image collected for position estimation. Since the capture condition is the same at both the time during the collection for position estimation and the time when images are registered to the reference dictionary, matching is performed at the position of the feature points that should be matched such as the feature point RF1 and the feature point SF1, the feature point RF2 and the feature point SF2, the feature point RF3 and the feature point SF3, the feature point RF4 and the feature point SF4. In this way, in the first embodiment, preventative measures against causes of decreased position estimation accuracy, such as stereo camera shaking etc., may be taken, and the moving body 50 position estimation process may be performed with feature point matching from high quality images. Therefore, the position estimation accuracy of the moving body 50 improves.

Further, in the embodiment, the image registered to the reference dictionary is captured when the velocity of the moving body 50 is equal to or lower than the threshold. Thus, it is considered that the blurring of images registered to the reference dictionary is kept to a minimum. Furthermore, if the moving body 50 is assumed to move autonomously, loss of speed often means it is at a position to be focused on, such as, for example, near the target position, a corner, or a dead end etc. A meaningful position estimation of the moving body 50 is performed by performing capture at such positions.

In the first embodiment, the moving body 50 and the position estimation device 1 are described as separate systems. However, the moving body 50 and the position estimation device 1 may be integral. Further, a part of the position estimation device 1 may be separate from the position estimation device 1. For example, the dictionary storage unit 30 may be provided with an external server outside the position estimation device 1.

Second Embodiment

Figure 8:
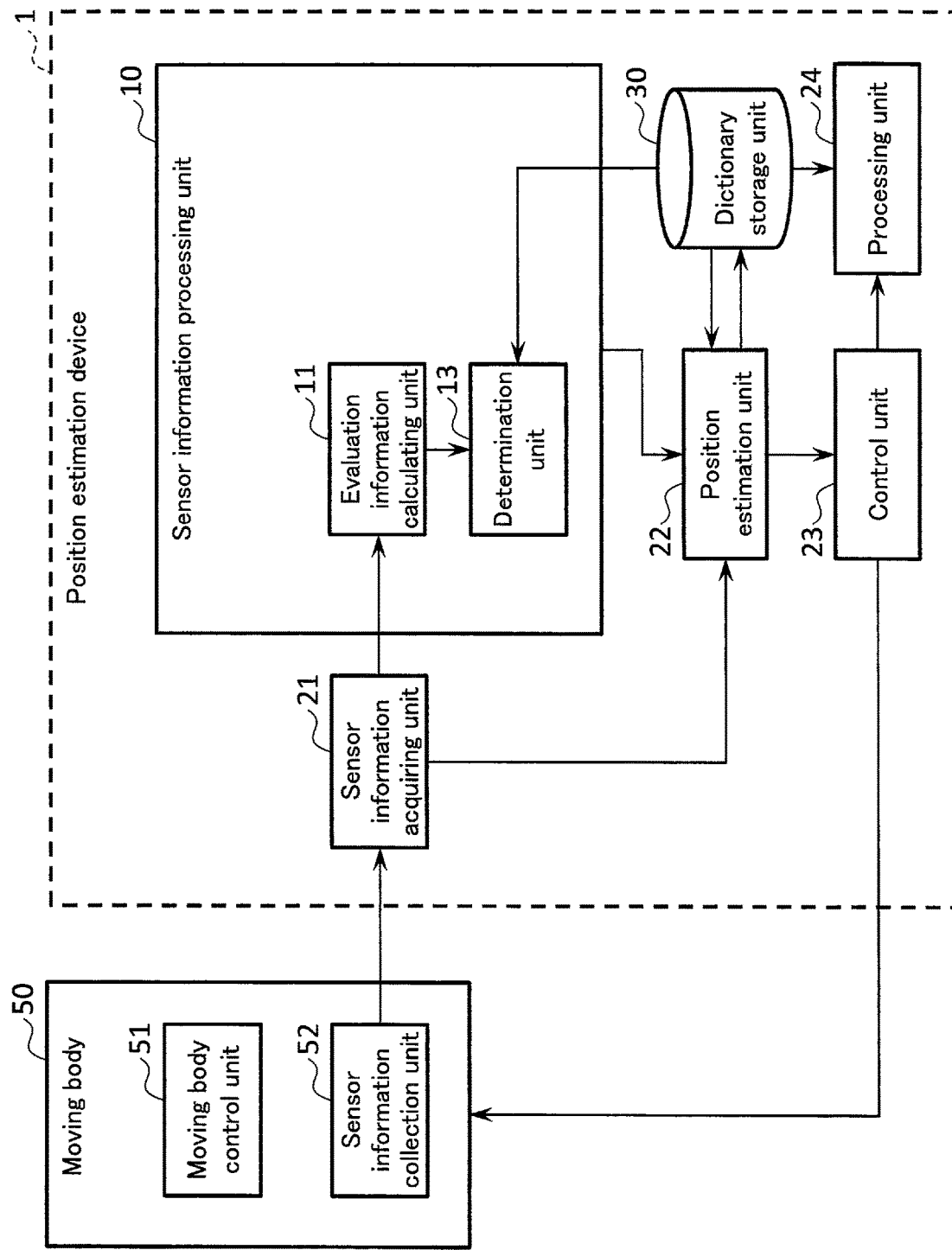
FIG. 8 is a diagram showing a configuration of one example of a system according to a second embodiment.

FIG. 8 is a diagram showing a configuration of one example of a system according to a second embodiment. Similar to the first embodiment, the system includes a position estimation device 1 and a moving body 50. The position estimation device 1 is configured to be communicable with the moving body 50. In the following explanation, for the parts similar to those of the first embodiment, the same reference numbers are added and detailed descriptions thereof are omitted. The second embodiment differs from the first embodiment only in that the position estimation device 1 includes a processing unit 24. The processing unit 24 is achieved by, for example, the CPU 101.

Figure 9:
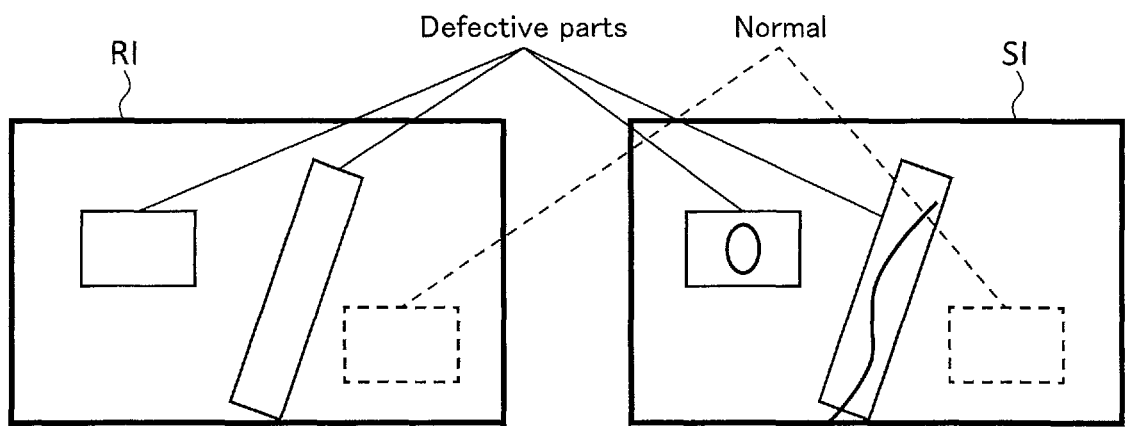
FIG. 9 is a diagram showing a detection example of a defective part by a processing unit.

The processing unit 24 compares an image of the target position registered to the reference dictionary of the dictionary storage unit 30 with an image of the target position collected at a different time in the moving body 50, and detects a defective part in the target position. The defective part is a part that does not originally exist in the target position such as holes, cracks, and scratches etc. on the walls. FIG. 9 is a diagram showing a detection example of the defective part by the processing unit 24.

As previously explained, the position estimation unit 22 of the embodiment estimates the position of the moving body 50 using an image adopted by the determination unit 12. Therefore, when the position of the moving body 50 estimated by the position estimation unit 22 is the target position, the capture conditions of an image SI, acquired at the sensor information acquiring unit 21, are similar to the capture conditions of an image RI of the target position registered to the reference dictionary, meaning that image RI and the image SI matches basically match. On the other hand, when the defective part is in the target position, as shown in FIG. 9, it will be indicated as the difference between the image RI and the image SI.

As a detection process of the defective part by the processing unit 24, various processes may be applied, such as: corresponding two images using feature point matching, and having the part with the greatest difference indicated as the defective part; detecting a part with a low degree of similarity found by template matching as the defective part; detecting a part with the biggest difference in brightness by a background subtraction method.

As explained above, according to the second embodiment, the detection of a defective part is performed using high quality images. Thus, various applications of the moving body 50 using the maintenance and inspection can be anticipated.

Similar to the first embodiment, the moving body 50 and the position estimation device 1 may be integral in the second embodiment. Further, a part of the position estimation device 1 may be separate from the position estimation device 1. For example, the dictionary storage unit 30 may be provided with an external server outside the position estimation device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A position estimation device comprising:
processing circuitry configured to:
    acquire an external image of a moving body from an external sensor installed in the moving body;
    acquire first evaluation information associated with a movement of the moving body collected by an internal sensor installed in the moving body when collecting the external image at the external sensor;
    acquire for position estimation at least one reference image associated with a collection position, the reference image having previously been collected under a same condition of the external image and in advance of acquisition of the external image, including,
    determine to adopt the external image as a first image for estimating a position of the moving body when a difference between the first evaluation information and second evaluation information of the reference image is within a certain range, the reference image being among a plurality of potential reference images and respective evaluation information registered in a dictionary storage unit; and estimate a position of the moving body by comparing the first image and the reference image.

2. The position estimation device according to claim 1, wherein the processing circuitry is further configured to detect a part different from the reference image in the first image as a defective part by comparing the first image and the reference image collected at a same collection position.

3. The position estimation device according to claim 1, wherein the first evaluation information and the reference evaluation information include at least either of a velocity of the moving body, and an angular velocity of the moving body.

4. The position estimation device according to claim 1, wherein the reference image is an image captured when an evaluation information associated with the movement of the moving body is equal to or lower than a threshold.

5. A system comprising:
a moving body comprising:
an external sensor configured to collect an external image of the moving body; and
an internal sensor configured to collect evaluation information associated with a movement of the moving body; and
a position estimation device comprising processing circuitry configured to:
acquire for position estimation at least one reference image associated with a collection position, the reference image having previously been collected under a same condition of the external image and in advance of acquisition of the external image, including, determine to adopt the external image as a first image for estimating a position of the moving body when a difference between first evaluation information associated with a movement of the moving body collected by the internal sensor when collecting the external image at the external sensor and second evaluation information of the reference image is within a certain range, the reference image being among a plurality of potential reference images and respective evaluation information registered in a dictionary storage unit; and estimate a position of the moving body by comparing the first image and the reference image.

6. A position estimation method comprising:
acquiring an external image of a moving body from an external sensor installed in the moving body;
acquiring first evaluation information associated with a movement of the moving body collected by an internal sensor installed in the moving body when collecting the external image at the external sensor;
acquiring for position estimation at least one reference image associated with a collection position, the reference image having previously been collected under a same condition of the external image and in advance of acquisition of the external image;
determining to adopt the external image as a first image for estimating a position of the moving body when a difference between the first evaluation information associated with the external image is within a predetermined range of second evaluation information associated with the reference image, the reference image being among a plurality of potential reference images and respective evaluation information being registered in a dictionary storage unit; and
estimating a position of the moving body by comparing the first image and the reference image.

* * * * *